US010817961B1

(12) United States Patent
Lu et al.

(10) Patent No.: US 10,817,961 B1
(45) Date of Patent: Oct. 27, 2020

(54) COMPUTERIZED SYSTEMS AND METHODS FOR TRACKING DYNAMIC COMMUNITIES

(71) Applicant: Coupang Corp., Seoul (KR)

(72) Inventors: Xiao Lu, San Jose, CA (US); Yonghui Chen, San Diego, CA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/897,337

(22) Filed: Jun. 10, 2020

(51) Int. Cl.
*G06F 15/16* (2006.01)
*G06Q 50/00* (2012.01)
*G06Q 10/10* (2012.01)
*H04L 29/08* (2006.01)
*G06Q 30/02* (2012.01)

(52) U.S. Cl.
CPC ............. *G06Q 50/01* (2013.01); *G06Q 10/10* (2013.01); *G06Q 30/02* (2013.01); *H04L 67/22* (2013.01); *H04L 67/306* (2013.01)

(58) Field of Classification Search
CPC ........ G06Q 50/01; G06Q 10/10; G06F 30/02; H04L 67/22; H04L 67/306
USPC ................................................ 709/203, 204
See application file for complete search history.

(56) References Cited

U.S. PATENT DOCUMENTS

| | | | | |
|---|---|---|---|---|
| 9,015,150 B2* | 4/2015 | Raghavan | ............. | G06F 16/248 707/722 |
| 10,305,758 B1* | 5/2019 | Bhide | ...................... | G06F 11/00 |
| 2003/0158897 A1* | 8/2003 | Ben-Natan | ............ | H04L 67/306 709/204 |
| 2004/0103147 A1* | 5/2004 | Flesher | ................... | G06F 16/27 709/204 |
| 2016/0086108 A1* | 3/2016 | Abelow | ................. | G06Q 10/10 705/7.29 |
| 2018/0359811 A1* | 12/2018 | Verzun | .................... | H04L 12/28 |

FOREIGN PATENT DOCUMENTS

| | | |
|---|---|---|
| JP | 2014-081782 | 5/2014 |
| KR | 10-2009-0089919 | 8/2009 |
| KR | 10-2015-0137102 | 12/2015 |
| KR | 10-1727831 | 4/2017 |
| KR | 10-2017-0088101 | 8/2017 |

OTHER PUBLICATIONS

Search Report dated Aug. 18, 2020, related to Korean Application No. KR 10-2020-0083643, 8 pages.

* cited by examiner

*Primary Examiner* — Frantz B Jean
(74) *Attorney, Agent, or Firm* — Finnegan, Henderson, Farabow, Garrett & Dunner, LLP

(57) ABSTRACT

Systems and method are provided for tracking online communities. One method includes at a first time, sorting the plurality of users by: determining that a group of the plurality of users belongs to a community, wherein the community has a community identification of zero; labeling each user in the group with the community identification of zero; labeling each user in the group with an algorithm identification, wherein the algorithm identification is associated with the community; determining that that one user of the group is a core user; and increasing the community identification counter by one; repeat the sorting until each user of the plurality of users is labeled with a community identification and an algorithm identification; and generate a community dynamics analysis based on the sorting of the plurality of users.

20 Claims, 12 Drawing Sheets

COMPUTERIZED SYSTEMS AND METHODS FOR TRACKING DYNAMIC COMMUNITIES

TECHNICAL FIELD

The present disclosure generally relates to computerized systems and methods for tracking dynamic communities. In particular, embodiments of the present disclosure relate to inventive and unconventional systems that may automatically track dynamic communities by automatically identifying communities and monitoring network phenomena among these communities.

BACKGROUND

Many organizations offer users a platform to interact with the organization. For example, online platforms may allow users to interact with the organization or with other users of the organization. The users may form intentional or unintentional communities on the online platform. For example, users may form an intentional community by explicitly creating a group for users to join (e.g., chat rooms, online channels, etc.). Users may form an unintentional community that naturally forms. For example, users who interact with the online platform over common interests may unintentionally form a community.

Monitoring online communities is critically important to any organization involving online users since managing malicious communities may be difficult and expensive when the malicious communities grow large. Conversely, managing beneficial communities may be difficult and expensive when the beneficial communities shrink small. However, unintentionally formed communities are more difficult to monitor than intentionally formed communities since intentionally formed communities are more well-designed and easier to track. This difficulty in monitoring unintentionally formed communities may be especially problematic when some communities behave fraudulently. Furthermore, manually searching through each user's or community's online activity to identify the fraudulent communities is often difficult and time-consuming for the organization.

Fraudulent activity by communities may result in unexpected losses to an organization. For example, some online users may coordinate with other users in the community to conduct fraudulent orders, a network of bots may crawl servers while adding no value to the online platform, a group of users may abuse their online accounts to apply for loans, or a group of users may use fraudulent credit cards to purchase products or services online. These abuses may quickly exhaust an organization's finances.

The quality of an organization's online platform and, consequently, the experiences of users and communities are severely reduced when the online platform includes fraudulent users who form communities. The quality of an organization's online platform would be significantly improved if the online platform automatically monitored the general health of online communities and identified and removed fraudulent communities that should be dissolved.

Therefore, there is a need for improved systems and methods for tracking dynamic online communities.

SUMMARY

One aspect of the present disclosure is directed to a system for tracking online communities. The system may include a plurality of users; a memory storing instructions; and at least one processor configured to execute instructions. The instructions may include, at a first time, labeling the plurality of users with a community identification of negative one; storing the plurality of users into a data store using an algorithm; starting a community identification counter, wherein an initial value of the community identification counter is zero; and sorting the plurality of users. The sorting may include: determining that a group of the plurality of users belongs to a community, wherein the community has a community identification of zero; labeling each user in the group with the community identification of zero; labeling each user in the group with an algorithm identification, wherein the algorithm identification is associated with the community; determining that that one user of the group is a core user; and increasing the community identification counter by one. The instructions may further include repeating the sorting until each user of the plurality of users is labeled with a community identification and an algorithm identification and generating a community dynamics analysis based on the sorting of the plurality of users.

Another aspect of the present disclosure is directed to a method for tracking online communities. The method may include a plurality of users; at a first time, labeling the plurality of users with a community identification of negative one; storing the plurality of users into a data store using an algorithm; starting a community identification counter, wherein an initial value of the community identification counter is zero; and sorting the plurality of users. The sorting may include: determining that a group of the plurality of users belongs to a community, wherein the community has a community identification of zero; labeling each user in the group with the community identification of zero; labeling each user in the group with an algorithm identification, wherein the algorithm identification is associated with the community; determining that that one user of the group is a core user; and increasing the community identification counter by one. The method may further include repeating the sorting until each user of the plurality of users is labeled with a community identification and an algorithm identification and generating a community dynamics analysis based on the sorting of the plurality of users. The method may further include, at a second time, searching the data store; determining that a first group of users of the plurality of users are not core users; removing the community identification associated with each user in the group; and applying the algorithm to the plurality of users in the data store to obtain a set of communities, wherein each community comprises at least one user of the plurality of users and is associated with a community identification and an algorithm identification.

Yet another aspect of the present disclosure is directed to a system for tracking online communities. The system may include a plurality of users; a memory storing instructions; and at least one processor configured to execute instructions. The instructions may include, at a first time, labeling the plurality of users with a community identification of negative one; storing the plurality of users into a data store using an algorithm; starting a community identification counter, wherein an initial value of the community identification counter is zero; and sorting the plurality of users. The sorting may include: determining that a group of the plurality of users belongs to a community, wherein the community has a community identification of zero; labeling each user in the group with the community identification of zero; labeling each user in the group with an algorithm identification, wherein the algorithm identification is associated with the community; determining that that one user of the group is a core user; and increasing the community identification counter by one. The instructions may further include repeating the sorting until each user of the plurality of users is labeled with a community identification and an algorithm identification. The instructions may further include, at a second time: searching the data store; determining that a first group of users of the plurality of users are not core users; removing the community identification associated with each user in the group; and applying the algorithm to the plurality of users in the data store to obtain a set of communities, wherein each community comprises at least one user of the plurality of users and is associated with a community identification and algorithm identification. The instructions may further include searching the set of communities; if a first community with a first community identification comprises one core user, then labeling each user in the first community with the first community identification; if a second community with a second community identification comprises a plurality of core users, then determining the community identification associated with each core user of the plurality of core users, determining the core user with the lowest numerical community identification, and labeling each user in the second community with the lowest numerical community identification; if a third community with a third community identification does not comprise a core user and the third community meets a threshold community requirement, then determining that the third community is a new community, labeling each user in the third community with a new community identification, and increasing the community identification counter by one; and if a fourth community with a fourth community identification does not meet a threshold community requirement, then determining that the fourth community is dissolved and labeling each user in the fourth community with a community identification of negative one. The instructions may further include generating a community dynamics analysis based on the sorting of the plurality of users.

Other systems, methods, and computer-readable media are also discussed herein.

DETAILED DESCRIPTION

Figure 1A:
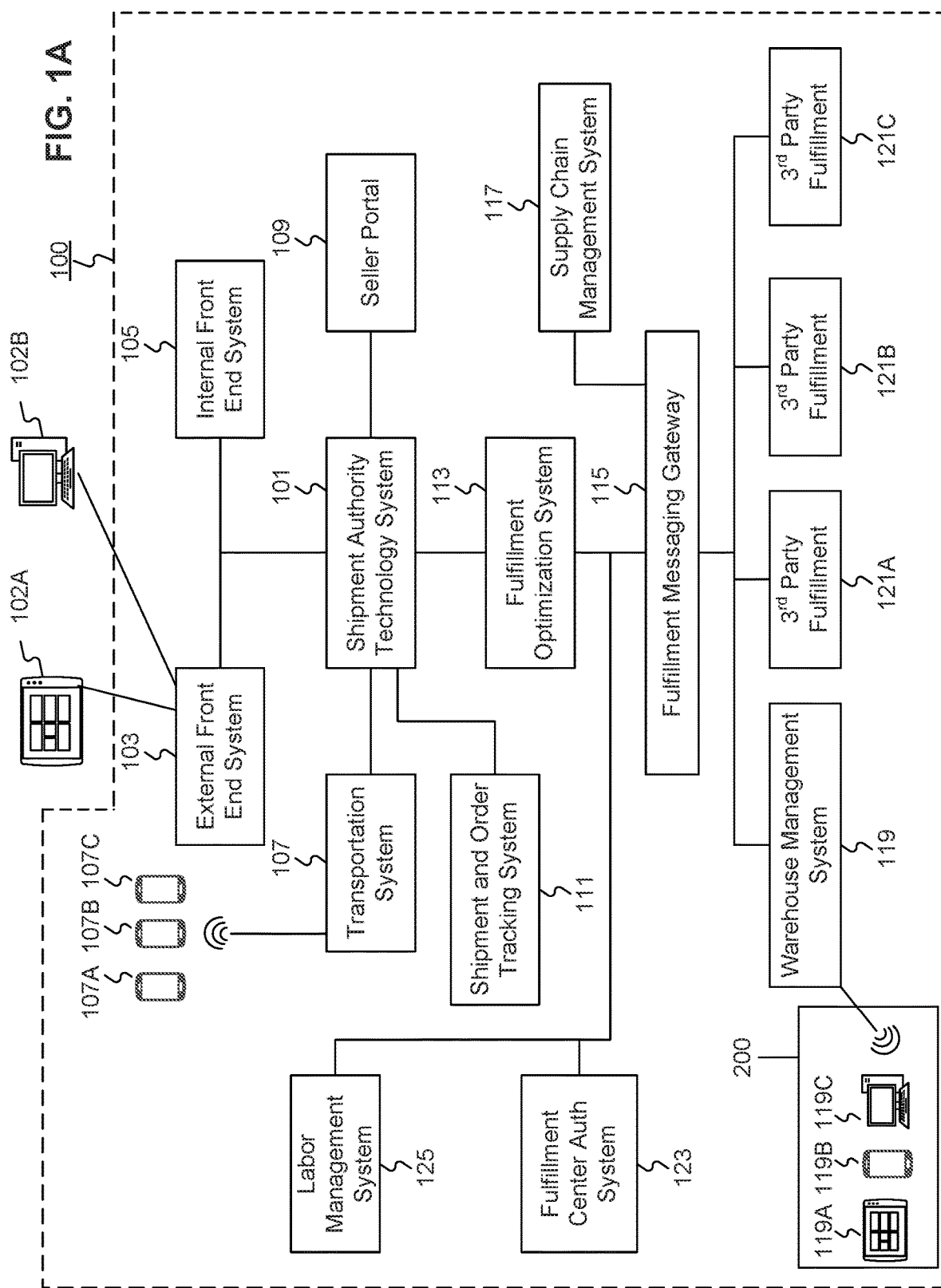
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for automatically tracking dynamic online communities. The disclosed embodiments are capable of automatically alerting users of the health of online communities based on users' activities among the communities. For example, for each edit at a first time, a system may label each user of a plurality of users with a community identification value of negative one to indicate that no communities exist among the users. The system may store the plurality of users into a database using an algorithm. The system may start a community identification counter where the initial value of the community identification counter is zero. The system may sort the plurality of edits associated with users into different communities based on the attributes of each edit. For example, if attributes of two edits associated with two users indicate that the users shared the same social media post, attended the same event, purchased the same item, communicated with each other, share the same political views, etc., then the system may determine that the two users belong to the same community.

In some embodiments, the system may identify an attribute for each edit and identify pairs of edits that share the attribute. For each pair of edits that share an attribute, the system may create an entry that may be stored in the database. Each entry stored in the database may include a pair of user account identifiers, an attribute that is shared by the pair of user account identifiers, and a pair of time entries associated with the user accounts. A plurality of entries may be created for pairs of edits that share more than one attribute. For example, if a pair of user accounts shares three attributes, then three different entries may be created, one entry for each of the attributes.

The system may assign a new community identification equal to the value of the community identification counter to a pair of edits when the system identifies an attribute that is shared by the pair of edits. For example, if the community identification counter is zero, then the system may assign a community identification value of zero to a pair of edits that share an attribute. The community identification may correspond to a community. The system may identify other edits that share the same attributes and assign the same community identification to the edits to indicate that the edits belong to the same community. The system may assign each edit algorithm identification associated with the community identification. For example, if the system applies an algorithm to two users who belong to the same community (e.g., have the same community identification), then the algorithm will return the same value (e.g., not necessarily the same value as the community identification). In some embodiments, the system may determine a core user in each community. The system may determine the core user of a community by calculating a centrality score of each user in the group and labeling the user with the highest centrality score as the core user. The system may repeat the steps described above until it identifies all the communities that exist among the users. The system may generate a community dynamics analysis based on the sorting of the plurality of users.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
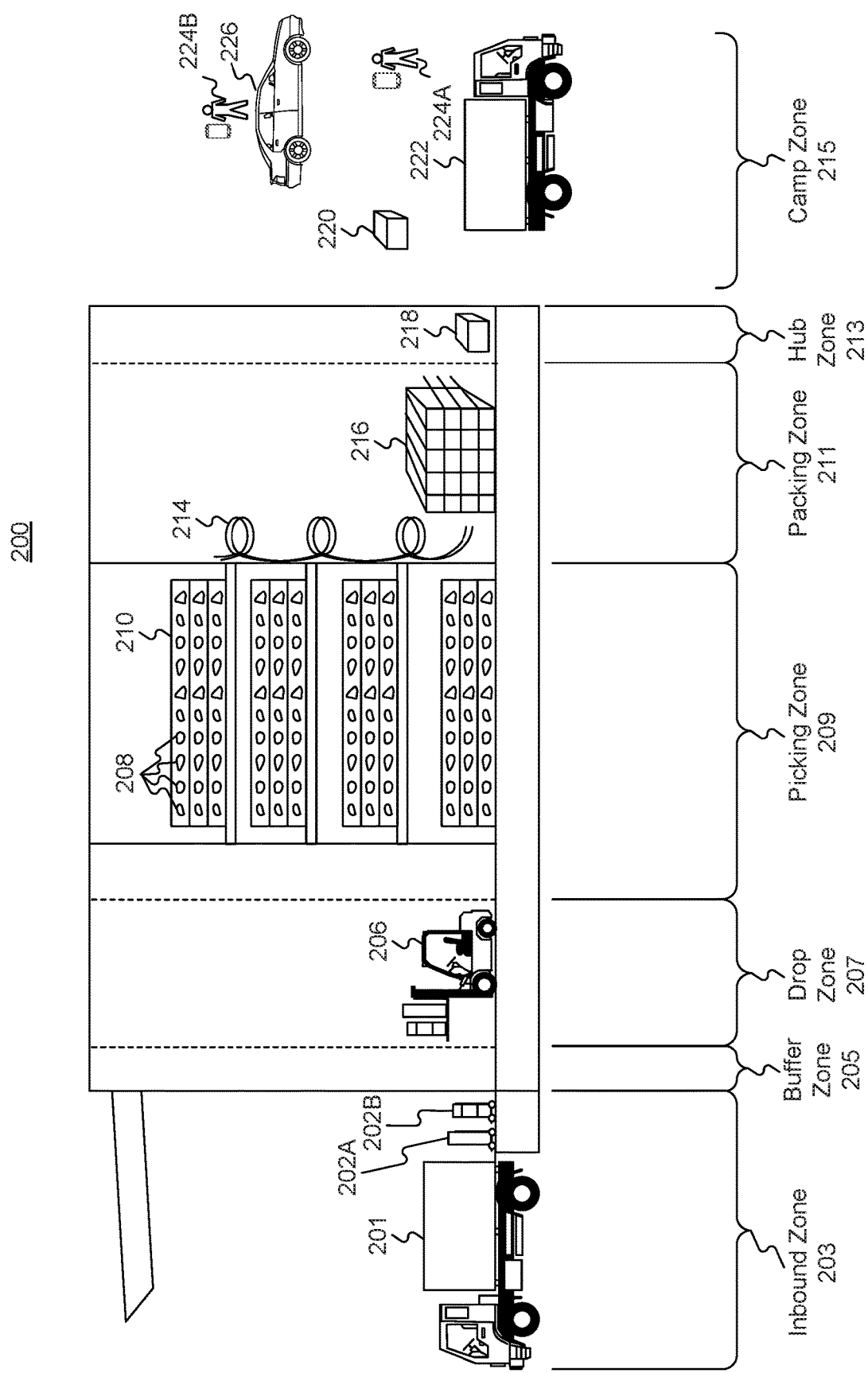
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
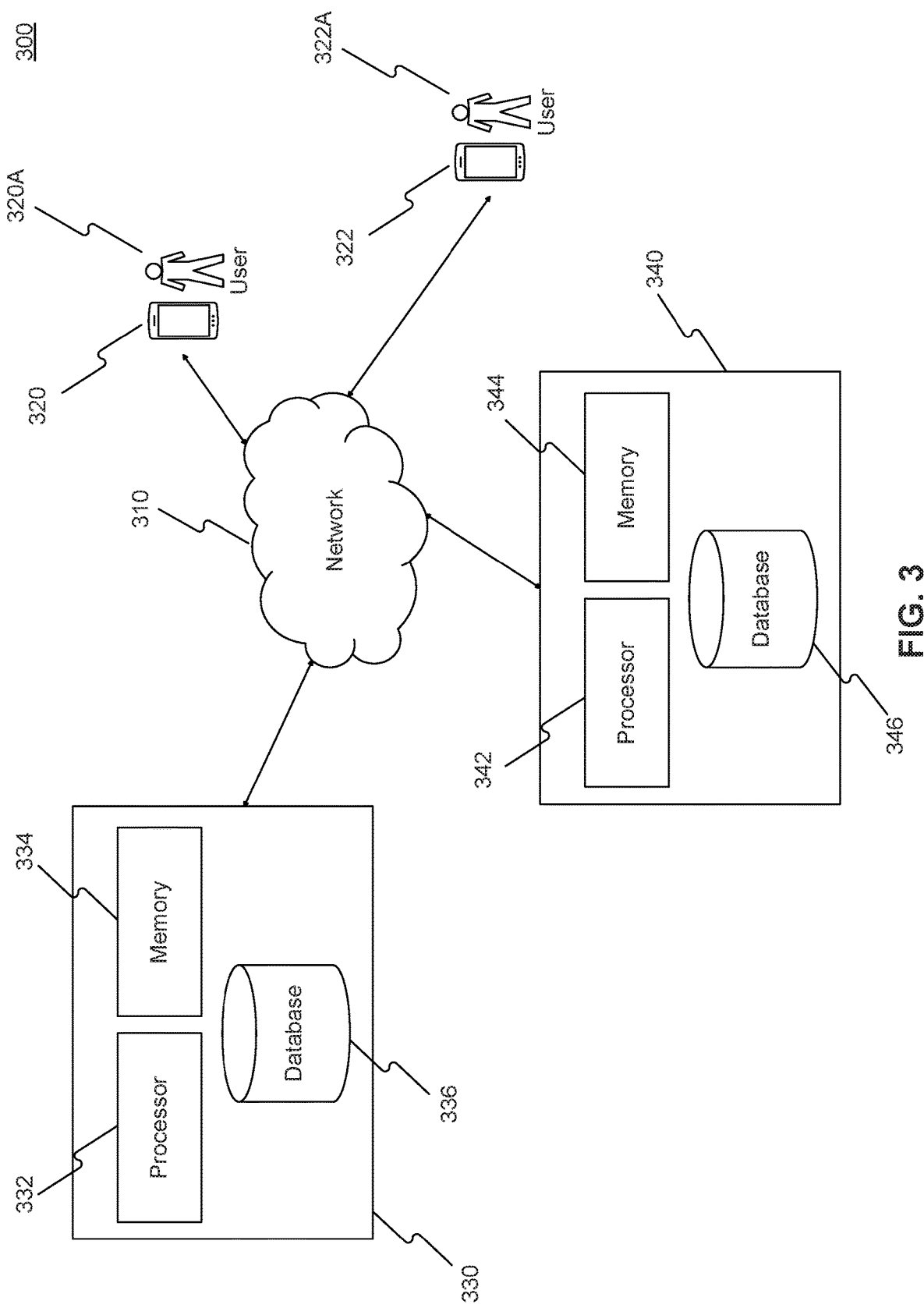
FIG. 3 depicts an exemplary network of devices and systems automatically tracking dynamic online communities, consistent with the disclosed embodiments.

Referring to FIG. 3, an exemplary network of devices and systems for automatically tracking dynamic online communities is shown. Although FIG. 3 shows an exemplary network of devices and systems for automatically tracking dynamic online communities, the embodiments of FIG. 3 are not limited to online communities and may be applied to other types of communities as well. As illustrated in FIG. 3, a system 300 may include an edge system 330 and a community monitor system 340, each of which may communicate with a user device 320 associated with a user 320A or a user device 322 associated with a user 322A via a network 310. In some embodiments, edge system 330 and community monitor system 340 may communicate with the other components of system 300 via a direct connection, for example, using a cable. In some other embodiments, system 300 may be a part of system 100 of FIG. 1A and may communicate with the other components of system 100 via network 310 or via a direct connection, for example, using a cable. Edge system 330 and community monitor system 340 may each comprise a single computer or may each be configured as a distributed computer system including multiple computers that interoperate to perform one or more of the processes and functionalities associated with the disclosed examples.

As shown in FIG. 3, edge system 330 may comprise a processor 332, a memory 334, and a database 336. Community monitor system 340 may comprise a processor 342, a memory 344, and a database 346. Processors 332 and 342 may be one or more known processing devices, such as a microprocessor from the Pentium™ family manufactured by Intel™ or the Turion™ family manufactured by AMD™. Processors 332 and 342 may constitute a single core or multiple core processor that executes parallel processes simultaneously. For example, processors 332 and 342 may use logical processors to simultaneously execute and control multiple processes. Processors 332 and 342 may implement virtual machine technologies or other known technologies to provide the ability to execute, control, run, manipulate, store, etc. multiple software processes, applications, programs, etc. In another example, processors 332 and 342 may include a multiple-core processor arrangement configured to provide parallel processing functionalities to allow edge system 330 and community monitor system 340 to execute multiple processes simultaneously. One of ordinary skill in the art would understand that other types of processor arrangements could be implemented that provide for the capabilities disclosed herein.

Memories 334 and 344 may store one or more operating systems that perform known operating system functions when executed by processors 332 and 342, respectively. By way of example, the operating system may include Microsoft Windows, Unix, Linux, Android, Mac OS, iOS, or other types of operating systems. Accordingly, examples of the disclosed invention may operate and function with computer systems running any type of operating system. Memories 334 and 344 may be a volatile or non-volatile, magnetic, semiconductor, tape, optical, removable, non-removable, or other type of storage device or tangible computer readable medium.

Databases 336 and 346 may include, for example, Oracle™ databases, Sybase™ databases, or other relational databases or non-relational databases, such as Hadoop™ sequence files, HBase™, or Cassandra™. Databases 336 and 346 may include computing components (e.g., database management system, database server, etc.) configured to receive and process requests for data stored in memory devices of the database(s) and to provide data from the database(s). Databases 336 and 346 may include NoSQL databases such as HBase, MongoDB™ or Cassandra™. Alternatively, databases 336 and 346 may include relational databases such as Oracle, MySQL and Microsoft SQL Server. In some embodiments, databases 336 and 346 may take the form of servers, general purpose computers, mainframe computers, or any combination of these components.

Databases 336 and 346 may store data that may be used by processors 332 and 342, respectively, for performing methods and processes associated with disclosed examples. Databases 336 and 346 may be located in edge system 330 and community monitor system 340, respectively, as shown in FIG. 3, or alternatively, they may be in external storage devices located outside of edge system 330 and community monitor system 340. Data stored in 336 and 346 may include any suitable data associated with users (e.g., web browsing history, online purchasing history, name, address, telephone number, e-mail address, IP address, computer identifier, social security number, birthday, credit card information, etc. for each user).

User devices 320 and 322 may be a tablet, mobile device, computer, or the like. User devices 320 and 322 may include a display. The display may include, for example, liquid crystal displays (LCD), light emitting diode screens (LED), organic light emitting diode screens (OLED), a touch screen, and other known display devices. The display may show various information to a user. For example, it may display the modified webpage that includes a modified user interface element, which includes an option to submit a request to register a new user account, submit a selection of a product for sale, etc. User device 320 may include one or more input/output (I/O) devices. The I/O devices may include one or more devices that allow user devices 320 and 322 to send and receive information from users 320A and 322A or another device. The I/O devices may include various input/output devices, a camera, a microphone, a keyboard, a mouse-type device, a gesture sensor, an action sensor, a physical button, an oratory input, etc. The I/O devices may also include one or more communication modules (not shown) for sending and receiving information from edit system 330 or community monitor system 340 by, for example, establishing wired or wireless connectivity between user devices 320 and 322 and network 310.

In some embodiments, users 320A or 322A may be internal users (e.g., employees of an organization that owns, operates, or leases systems 100 or 300). Internal front end system 105 may be implemented as a computer system that enables users 320A or 322A to interact with system 300. For example, in embodiments where systems 100 or 300 enable the presentation of systems to enable users to place an order for an item, internal front end system 105 may be implemented as a web server that enables users 320A or 322A to view diagnostic and statistical information about user web browsing history, online purchasing history, or user accounts, to modify user accounts, or to review statistics relating to user accounts. In some embodiments, internal front end system 105 may run custom web server software designed to receive and process requests from systems or devices depicted in systems 100 or 300, acquire information from databases (e.g., databases 336 or 346) and other data stores based on those requests, and provide responses to the received requests based on acquired information.

For example, users 320A or 322A may submit a request to initialize databases 336 or 346 via internal front end system 105. Edge system 330 and community monitor system 340 may receive the request to initialize databases 336 or 346, respectively, via internal front end system 105 over network 310. Edge system 330 may initialize database 336 by searching a plurality of edits in database 336. Each edit may include a user account identifier, at least one attribute, and a time entry. The user account identifier may be associated with a registered user account. An attribute may include a name, address, telephone number, e-mail address, IP address, computer identifier, social security number, birthday, or credit card information associated with a user. An attribute may also include characteristics based on a user's web browsing history, online purchasing history, or social media activity. For example, an attribute may include a shared social media post, indication of attending an event, a purchased item, etc. A time entry may include the time (e.g., month, day, year, hour, minutes, seconds, etc.) at which the associated user account was registered to systems 100 or 300. For each edit, edge system 330 may identify an attribute and identify pairs of edits that share the attribute. For each pair of edits that share an attribute, edge system 330 may create an entry that may be stored in database 336. Each entry stored in database 336 may include a pair of user account identifiers, an attribute that is shared by the pair of user account identifiers, and a pair of time entries associated with the user accounts. A plurality of entries may be created for pairs of edits that share more than one attribute. For example, if a pair of user accounts shares three attributes, then three different entries may be created, one entry for each of the attributes.

In some embodiments, creating each entry may include edge system 330 creating a table of entries stored in database 336 and indexing the table. For example, each row of the table may correspond to an entry in database 336. Each entry may include a pair of edits, where each edit includes a user account identifier, an attribute, and a time entry. A first column of the table may include a first edit of the entry and a second column of the table may include a second edit of the entry.

In some embodiments, community monitor system 340 may initialize database 346 by searching a plurality of edits in database 346. Databases 336 and 346 may be linked so that the plurality of edits in databases 336 and 346 are the same. In some embodiments, databases 336 and 346 may be independent, but include the same plurality of edits. Each edit may include a user account identifier, at least one attribute, and a time entry. The user account identifier may be associated with a registered user account. An attribute may include a name, address, telephone number, e-mail address, IP address, computer identifier, social security number, birthday, or credit card information associated with a user. An attribute may also include characteristics based on a user's web browsing history, online purchasing history, or social media activity. For example, an attribute may include a shared social media post, indication of attending an event, a purchased item, etc. A time entry may include the time (e.g., month, day, year, hour, minutes, seconds, etc.) at which the associated user account was registered to systems 100 or 300.

For each edit at a first time, community monitor system 340 may assign a community identification value of negative one to indicate that no communities exist among the users. Community monitor system 340 may start a community identification counter where the initial value of the community identification counter is zero. Community monitor system 340 may store the plurality of users into database 346 using an algorithm (e.g., connected component algorithm, Louvain modularity algorithm, label propagation algorithm, etc.). Community monitor system 340 may sort the plurality of edits associated with users into different communities based on the attributes of each edit. For example, if attributes of two edits associated with two users indicate that the users shared the same social media post, attended the same event, purchased the same item, communicated with each other, share the same political views, etc., then community monitor system 340 may determine that the two users belong to the same community. In some embodiments, community monitor system 340 may identify an attribute for each edit and identify pairs of edits that share the attribute. For each pair of edits that share an attribute, community monitor system 340 may create an entry that may be stored in database 346. Each entry stored in database 346 may include a pair of user account identifiers, an attribute that is shared by the pair of user account identifiers, and a pair of time entries associated with the user accounts. A plurality of entries may be created for pairs of edits that share more than one attribute. For example, if a pair of user accounts shares three attributes, then three different entries may be created, one entry for each of the attributes.

Community monitor system 340 may assign a new community identification equal to the value of the community identification counter to a pair of edits when community monitor system 340 identifies an attribute that is shared by the pair of edits. For example, if the community identification counter is zero, then community monitor system 340 may assign a community identification value of zero to a pair of edits that share an attribute. The community identification may correspond to a community. Community monitor system 340 may identify other edits that share the same attributes and assign the same community identification to the edits to indicate that the edits belong to the same community. Community monitor system 340 may assign each edit with an algorithm identification associated with the community identification. For example, if community monitor system 340 applies the algorithm to two users who belong to the same community (e.g., have the same community identification), then the algorithm will return the same value (e.g., not necessarily the same value as the community identification).

Community monitor system 340 may increase the community identification counter by one after it identifies each user that belongs to the community associated with the community identification value of zero and the corresponding algorithm identification. Community monitor system 340 may repeat the steps described above until it identifies all the communities that exist among the users. For example, community monitor system 340 may assign a new community identification equal to the value of the community identification counter to a pair of edits that share an attribute different from the attribute associated with the community identification of zero. For example, community monitor system 340 may assign a community identification value of one to a pair of edits that share an attribute different from the attribute associated with the community identification value of zero. The community identification of one may correspond to a different community from the community associated with the community identification of zero. Community monitor system 340 may identify other edits that share the same attributes and assign the same community identification to the edits to indicate that the edits belong to the same community. Community monitor system 340 may assign each edit with an algorithm identification associated with the community identification of one. In some embodiments, users 320A or 322A may be internal analysts or stakeholders who define each community and community monitor system 340 may label users with community identifications and algorithm identifications based on the definition.

In some embodiments, community monitor system 340 may perform the steps described above in various sequences. For example, community monitor system 340 may assign a community identification and an algorithm identification to a first pair of edits, find other pairs of edits that share at least one attribute with the first pair of edits, and assign the community identification and algorithm identification to the other pairs of edits before increasing the community identification counter by one.

Community monitor system 340 may determine a core user in each community. Community monitor system 340 may determine the core user of a community by calculating a centrality score of each user in the group and labeling the user with the highest centrality score as the core user. For example, the centrality score of each user may be calculated using a degree centrality formula, where users with the highest number of links to other users in their respective communities have the highest centrality scores. For example, a user may be linked to another user if they share an attribute. A user that shares at least one attribute with many different users is linked to many users and may have a higher centrality score than a user with a single link. In some embodiments, the centrality score of each user may be calculated using a betweenness centrality formula, where users who most frequently act as bridges between other users have a higher centrality scores. These users with higher betweenness centrality scores are users who may form the shortest pathways of communication within a community. In some embodiments, the centrality score of each user may be calculated using a closeness centrality formula, where users who are closest to the other users in a community may have a higher centrality score. The closeness centrality score may be calculated by calculating the shortest path between each user and assigning each user a score based on the sum of all the paths. Users with a higher closeness centrality score may have a lower path distance to all the other users. In some embodiments, users 320A or 322A may be internal analysts or stakeholders who choose the centrality calculation formula and community monitor system 340 may determine the core users based on the chosen formula.

At a second time, changes in the community dynamics may occur due to user activity. For example, some users may leave a first community and join an existing community. Community monitor system 340 may search database 346 and retrieve users who are not labeled as core users. Community monitor system 340 may remove the community identification associated with each non-core user and apply the algorithm to the non-core users to obtain a set of communities, where each community includes at least one user of the plurality of non-core users and each community is associated with a community identification and an algorithm identification.

Community monitor system 340 may search each community in the obtained set of communities for a core user. If a community has exactly one core user, then community monitor system 340 may label each non-core user in the community with the same community identification as the core user. If a community has more than one core user, then community monitor system 340 may determine the community identification associated with each core user. Community monitor system 340 may identify the core user with the lowest numerical community identification and label each user in the community with that lowest numerical community identification, including the other core users with greater numerical community identifications. Community monitor system 340 may label each user in the community with the lowest numerical community identification since the community associated with that community identification may be the community that is formed the earliest among the communities associated with the core users.

If a community has no core users, but meets the minimum threshold requirements to be a community, then community monitor system 340 may determine that the community is a new community and label each user in the community with a new community identification. Minimum threshold requirements to be a community may include a minimum community age or a minimum community size. The new community identification may be the value of the community identification counter at that time. If a community has exactly one core user but does not meet the minimum threshold requirements to be a community, then community monitor system 340 may determine that the community is dissolved and label each user in the community with a community identification value of negative one (−1) to indicate that the user does not belong to a community.

Community monitor system 340 may compute a centrality score for each user at any point in time to determine the new core user of each community. In some embodiments, community monitor system 340 may automatically detect and monitor the evolution of communities and alert a system administrator (e.g., an internal user of systems 100 or 300) to take action when it detects fraudulent activities among communities. For example, activities that may signal a community event include when a community reaches certain size (e.g., a predetermined standard size set by a community), when a community splits, or when a plurality of communities merge into a single community. Activities may alert a system administrator depending on a standard set by a community (e.g., for some communities, communities merging may indicate fraudulent activities). In some embodiments, a community may be flagged as "dangerous" (e.g., the community was infected by a virus). When a new user joins the dangerous community, community monitor system 340 may closely monitor activities of the new user. For example, community monitor system 340 may generate a community dynamics analysis based on the community information at many different or frequent points in time when the new user joins. In some embodiments, community monitor system 340 may compare the community dynamics analyses at the different times (e.g., compare the community dynamics analysis at the first time to the community dynamics analysis at the second, third, fourth, etc. times) to determine the evolution of the dangerous community (e.g., determine if the community grows or if the community shrinks). In some embodiments, the community dynamics analysis may include any information from systems 100 or 300 (e.g., user account identifiers, attributes, time entries, pairs of edits, community identifications of users, attributes associated with each community, the number of users in each community, core users, centrality scores of users, etc.).

Community monitor system 340 may monitor any naturally accumulating and dispersing groups of people, animals, viruses, legal entities, or information across a network. Users 320A or 322A (or any users of systems 100 or 300) may use community monitor system 340 to efficiently monitor the health of systems 100 and 300 and determine when malicious communities grow or beneficial communities shrink. Users 320A or 322A may respond differently to alerts depending on the nature or impact of the community. In some embodiments, internal users of systems 100 or 300 may submit a request to community monitor system 340 to detect or monitor the evolution of communities.

In some embodiments, users 320A or 322A may be consumers. Users 320A or 322A may submit a request to register a user account via external front end system 103, which may be implemented as a web server that receives requests to register user accounts, search requests, presents item pages, and solicits payment information. External front end system 103 may run custom web server software designed to receive and process requests from external devices (e.g., user devices 320 or 322), acquire information from databases (e.g., databases 336 or 346), and other data stores based on those requests, and provide responses to the received requests based on acquired information. For example, users 320A or 322A may use user devices 320 or 322 to navigate to external front end system 103 and submit a request to register a user account by entering information into a submission box. External front end system 103 may request information from one or more systems in systems 100 or 300. For example, external front end system 103 may request information from edge system 330 or community monitor system 340. Edge system 330 or community monitor system 340 may receive the request for information via external front end system 103 over network 310. Community monitor system 340 may retrieve users 320A or 322A's online community activity or information and send the data to external front end system 103. The data sent to external front end system 103 may indicate that users 320A or 322A's online community activity or information is beneficial, malicious, or not existent.

Edge system 330 or community monitor system 340 may record the time of different online activity of users 320A or 322A.

Systems 330 and 340 may add a new edit to databases 336 and 346 that includes the user account identifier of an approved request to register, at least one attribute, and a time entry of the time at which the user account of the approved request was registered to systems 100 or 300. Edge system 330 may create new entries, including pairs of edits, by adding new rows to the table of database 336 and indexing the new rows. Each new entry may include the new edit and an edit of the retrieved entries. Each new entry may include a pair of user account identifiers, an attribute that is shared by the pair of user account identifiers, and a pair of time entries associated with the user accounts.

In some embodiments, users 320A or 322A may be consumers who use user devices 320 or 322 to select a product from the SRP, e.g., by clicking or tapping a user interface, or using another input device, to select a product represented on the SRP. User device 320 or 322 may formulate a request for information on the selected product and send it to external front end system 103. In response, external front end system 103 may send user account information associated with users 320A or 322A to and request information related to the user account of users 320A or 322A from system 300. Edge system 330 or community monitor system 340 may receive the user account information or community information and identify at least one attribute included in the user account information. Edge system 330 or community monitor system 340 may search databases 336 or 346 to retrieve entries that include attributes that match the received attributes or other community information.

At any point in time (e.g., after the first time, after the second time, etc.), community monitor system 340 may generate a community dynamics analysis based on the community information at that point in time. In some embodiments, community monitor system 340 may compare the community dynamics analyses at different times (e.g., compare the community dynamics analysis at the first time to the community dynamics analysis at the second time) to determine the evolution of communities (e.g., determine when malicious communities grow or beneficial communities shrink), detect when fraudulent activities occur among communities, or monitor the health of the communities or systems 100 and 300. In some embodiments, a community dynamics analysis may include any information from systems 100 or 300 (e.g., user account identifiers, attributes, time entries, pairs of edits, community identifications of users, attributes associated with each community, the number of users in each community, core users, centrality scores of users, etc.).

Figure 4:
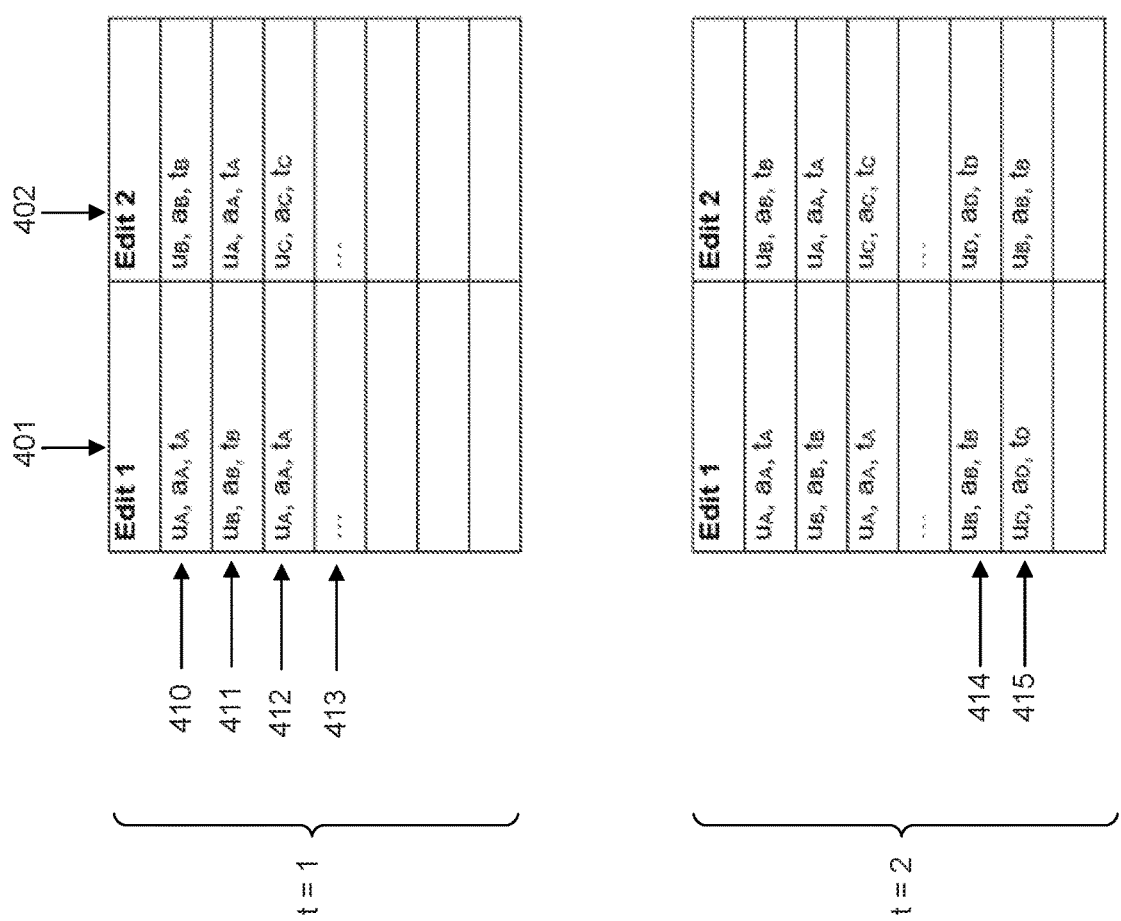
FIG. 4 depicts an exemplary table of a database for automatically tracking dynamic online communities, consistent with the disclosed embodiments.

Referring to FIG. 4, an exemplary table of a database for fraud detection and user account deduplication is shown. As illustrated in FIG. 4, database 336 may include a table 400. Edge system 330 may initialize database 336 by creating rows of entries 410, 411, 412, and 413. Each entry may include a pair of columns that include edits 401 and 402. Each edit may be associated with a different user. For example, entry 410 may include users A and B, entry 411 may include users B and A, and entry 412 may include users A and C. Each edit may include a user account identifier "u", an attribute "a" shared by the pair of user account identifiers, and a time entry "t" associated with the user account. A plurality of entries may be created for pairs of edits that share more than one attribute. In some embodiments, entries 410 and 411 may include the same users A and B and their associated user account identifiers, attributes, and time entries. Entry 410 may include user A in edit 401 and user B in edit 402 while entry 411 may include user B in edit 401 and user A in edit 402. This organization of entries may allow edge system 330 to efficiently retrieve edits (e.g., edits 402) associated with a user (e.g., user A) by searching edits in a single column (e.g., edits 401). For example, edge system 330 may search edits 401 to determine that users B and C are associated with user A or to determine that user A is associated with user B.

In some embodiments, database 336 may be initialized at a first time t=1 and new entries may be added to database 336 at a second time t=2. For example, at time t=2 edge system 330 may search indexed database 336 based on information received from users 320A or 322A. Because database 336 is already indexed, system 330 may identify and retrieve at least one of entries 410, 411, 412, or 413 if they include attributes that match the attributes received from users 320A or 322A.

System 330 may add a new edit to database 336 that includes the user account identifier of an approved request to register, at least one attribute, and a time entry of the time at which the user account of the approved request was registered to systems 100 or 300. Edge system 330 may create new entries, including pairs of edits, by adding new rows to the table of database 336 and indexing the new rows. For example, new entries 414 and 415 may be added to table 400 at t=2. Each new entry may include the new edit and an edit of the retrieved entries. For example, user D may be associated with a newly registered user account while user B is associated with a retrieved entry that was already indexed at t=1. Each new entry may include a pair of user account identifiers, an attribute that is shared by the pair of user account identifiers, and a pair of time entries associated with the user accounts.

Database 336 may be initialized at t=1 and the indexed database 336 may be searched at t=2 after t=1. Database 336 may only be initialized once so that subsequent requests to register user accounts may be processed with a low computation load. For example, initialized database 336 may require a quadratic complexity at t=1 while processing each request after initialization may only require a linear complexity at t=2 since the approved requests received after initialization may be added to table 400 without re-indexing the existing entries in the database.

Figure 5:
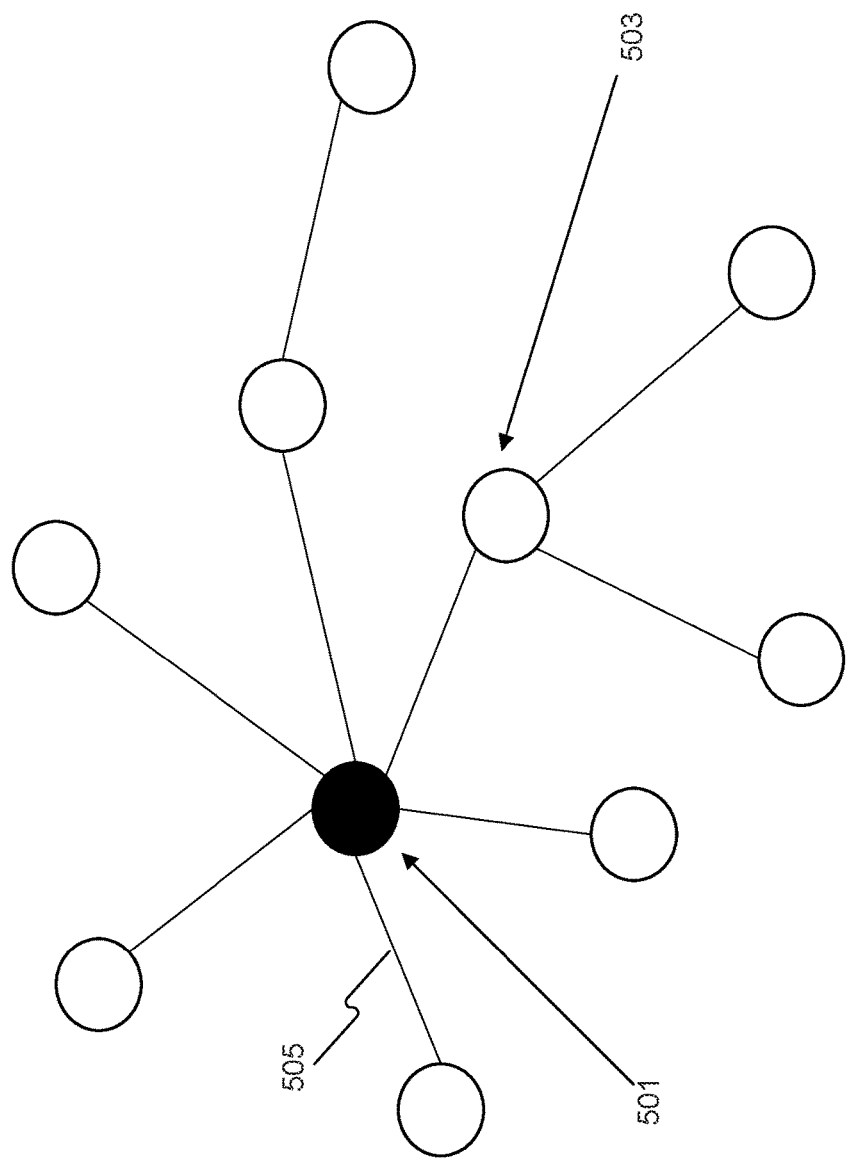
FIG. 5 depicts an exemplary diagram of a community of users, consistent with the disclosed embodiments.

Referring to FIG. 5, an exemplary diagram of a community of users is shown. As illustrated in FIG. 5, a community 500 of users may include users 501 and 503. The users within the community may be connected to other users by links 505. Links 505 may represent a row of an entry of database 336 (e.g., rows of entries 410, 411, 412, and 413 of table 400). Links 505 may represent a connection between information associated with two users (e.g., edits 401 and 402 of table 400). Community monitor system 340 may determine the core user of a community 500 by calculating a centrality score of each user (e.g., users 501 and 503) in the group and labeling the user with the highest centrality score as the core user. For example, the centrality score of each user may be calculated using a degree centrality formula, where users with the highest number of links to other users in their respective communities have the highest centrality scores. For example, a user may be linked to another user if they share an attribute. A user that shares at least one attribute with many different users is linked to many users and may have a higher centrality score than a user with a single link. For example, community monitor system 340 may determine that user 501 has a higher calculated centrality score than user 503 since user 501 has a higher number of links 505 to other users in community 500 than user 503.

Figure 6:
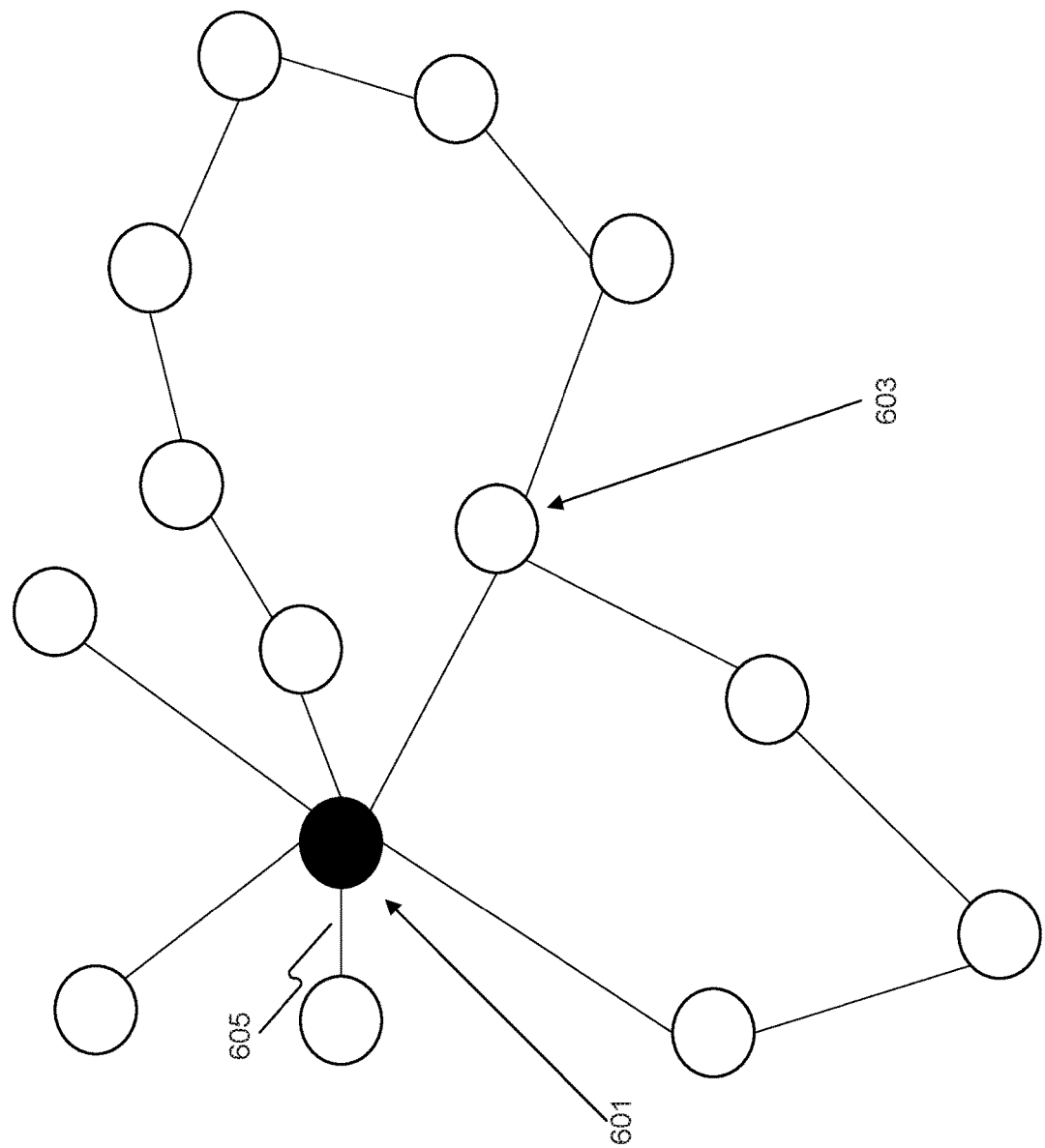
FIG. 6 depicts an exemplary diagram of a community of users, consistent with the disclosed embodiments.

Referring to FIG. 6, an exemplary diagram of a community of users is shown. As illustrated in FIG. 6, a community 600 of users may include users 601 and 603. The users within the community may be connected to other users by links 605. Links 605 may represent a row of an entry of database 336 (e.g., rows of entries 410, 411, 412, and 413 of table 400). Links 605 may represent a connection between information associated with two users (e.g., edits 401 and 402 of table 400). Community monitor system 340 may determine the core user of a community 600 by calculating a centrality score of each user (e.g., users 601 and 603) in the group and labeling the user with the highest centrality score as the core user. For example, the centrality score of each user may be calculated using a closeness centrality formula, where users who are closest to the other users in a community may have a higher centrality score. The closeness centrality score may be calculated by calculating the shortest path between each user and assigning each user a score based on the sum of all the paths. Users with a higher closeness centrality score may have a lower path distance to all the other users. For example, community monitor system 340 may determine that user 601 has a higher calculated centrality score than user 603 since user 601 has a lower path distance to all the other users than user 603.

Figure 7:
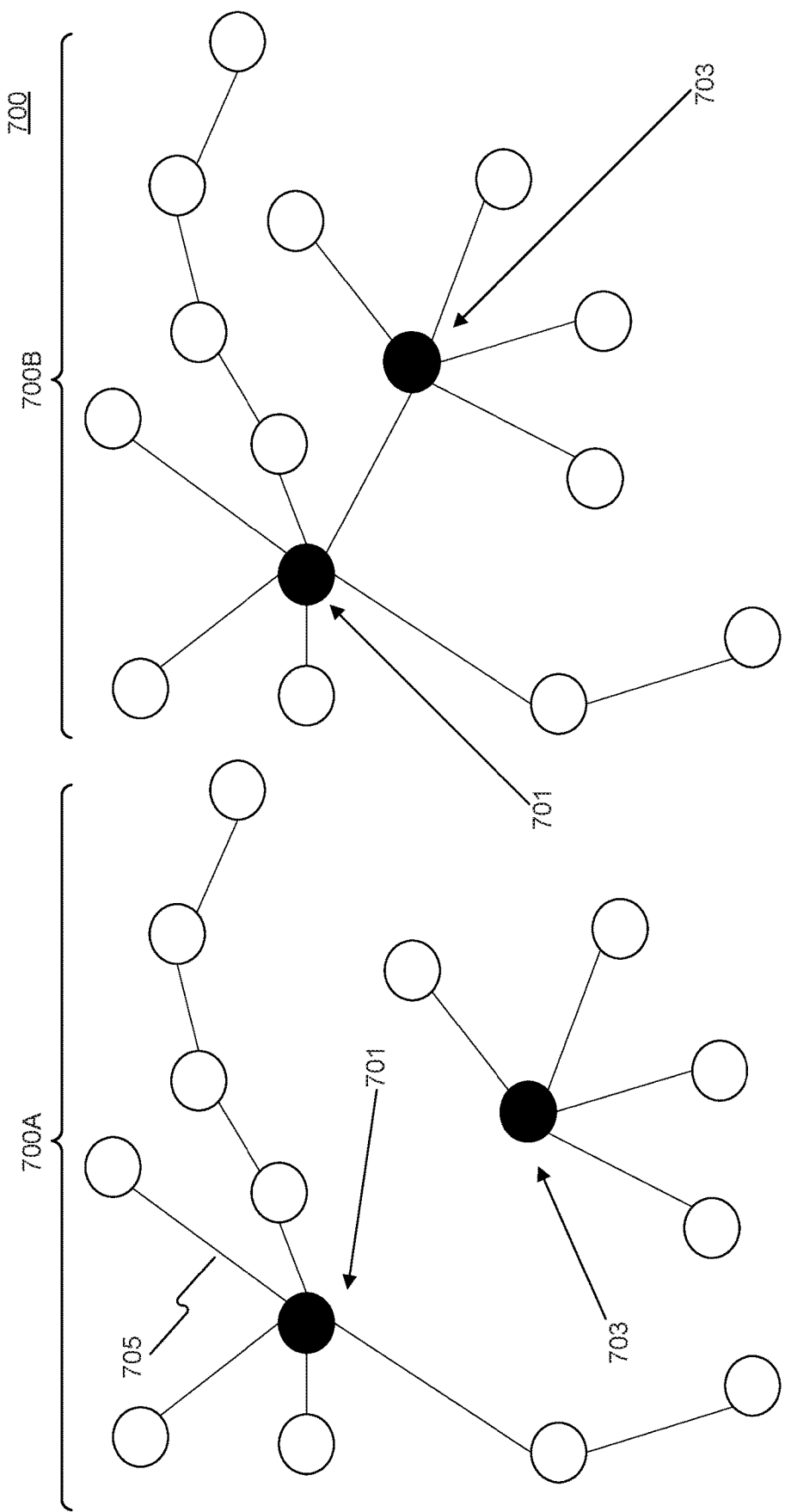
FIG. 7 depicts an exemplary diagram of communities of users, consistent with the disclosed embodiments.

Referring to FIG. 7, an exemplary diagram 700 of communities of users is shown. As illustrated in FIG. 7, a group 700A of two communities may include users 701 and 703. Group 700A may show two communities at a first time, where user 701 is the core user of a first community and user 703 is the core user of a second community. The users within the communities may be connected to other users by links 705. Links 705 may represent a row of an entry of database 336 (e.g., rows of entries 410, 411, 412, and 413 of table 400). Links 705 may represent a connection between information associated with two users (e.g., edits 401 and 402 of table 400). Group 700B may show that the two communities merged into a single community at a second time, where the community has two core users 701 and 703. If a community has more than one core user, then community monitor system 340 may determine the community identification associated with each core user. Community monitor system 340 may identify the core user with the lowest numerical community identification and label each user in the community with that lowest numerical community identification, including the other core user with a greater numerical community identification. Community monitor system 340 may label each user in the community with the lowest numerical community identification since the community associated with that community identification may be the community that is formed the earliest among the communities associated with the core users.

Figure 8:
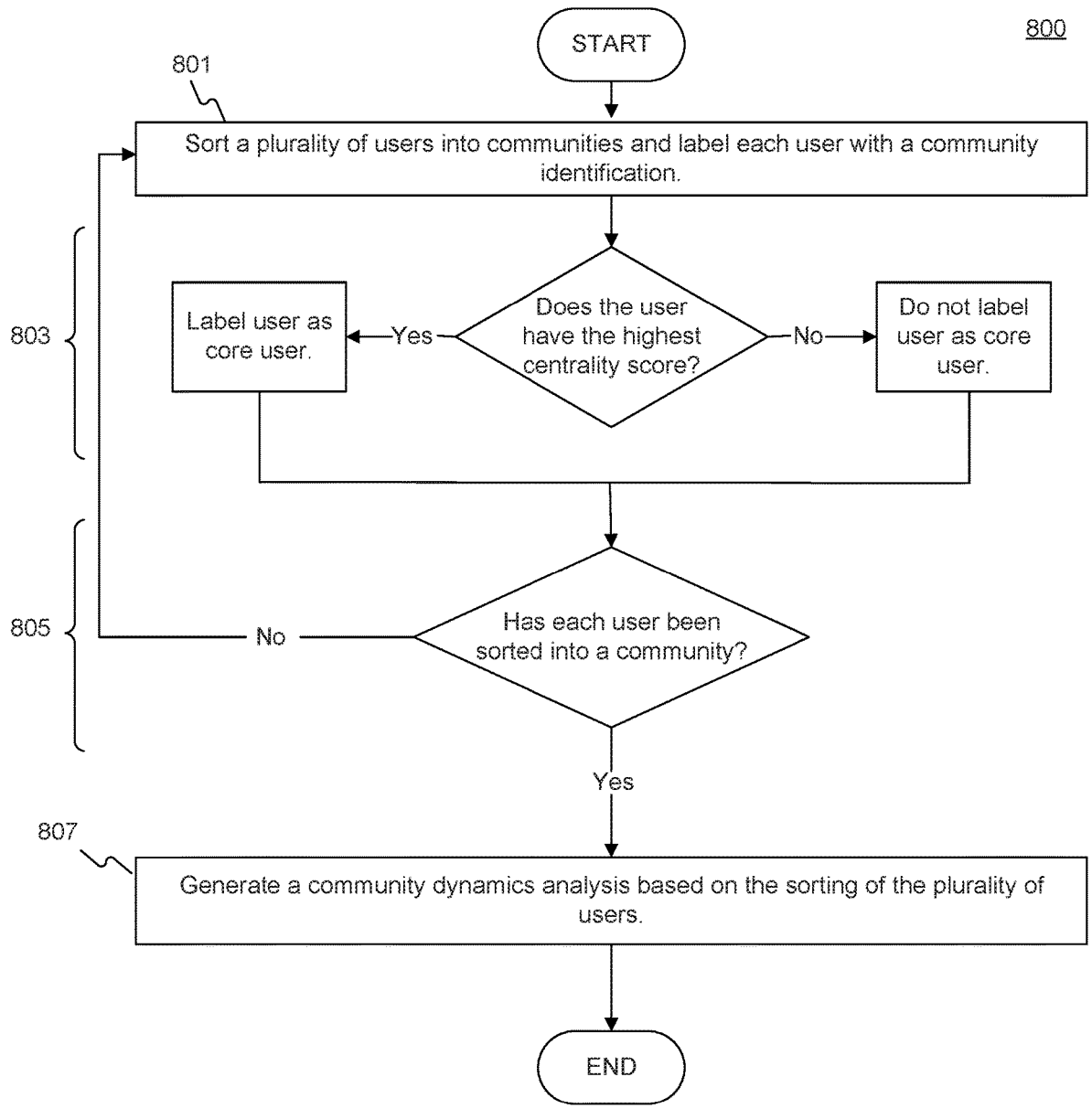
FIG. 8 depicts a process for tracking online communities, consistent with the disclosed embodiments.

Referring to FIG. 8, a process 800 for tracking online communities is shown. Although FIG. 8 shows an exemplary process for tracking dynamic online communities, the embodiments of FIG. 8 are not limited to online communities and may be applied to other types of communities as well. While in some embodiments community monitor system 340 may perform several of the steps described herein, other implementations are possible. For example, any of the systems and components (e.g., system 100, edge system 330, etc.) described and illustrated herein may perform the steps described in this disclosure.

In step 801, for each edit at a first time, community monitor system 340 may sort a plurality of users into communities and label each user with a community identification. Community monitor 340 may perform step 801 by labeling each user of a plurality of users with a community identification value of negative one to indicate that no communities exist among the users. Community monitor system 340 may store the plurality of users into database 346 using an algorithm.

Community monitor system 340 may start a community identification counter where the initial value of the community identification counter is zero. Community monitor system 340 may sort the plurality of edits associated with users into different communities based on the attributes of each edit. For example, if attributes of two edits associated with two users indicate that the users shared the same social media post, attended the same event, purchased the same item, communicated with each other, share the same political views, etc., then community monitor system 340 may determine that the two users belong to the same community. In some embodiments, community monitor system 340 may identify an attribute for each edit and identify pairs of edits that share the attribute. For each pair of edits that share an attribute, community monitor system 340 may create an entry that may be stored in database 346. Each entry stored in database 346 may include a pair of user account identifiers, an attribute that is shared by the pair of user account identifiers, and a pair of time entries associated with the user accounts. A plurality of entries may be created for pairs of edits that share more than one attribute. For example, if a pair of user accounts shares three attributes, then three different entries may be created, one entry for each of the attributes.

Community monitor system 340 may assign a new community identification equal to the value of the community identification counter to a pair of edits when community monitor system 340 identifies an attribute that is shared by the pair of edits. For example, if the community identification counter is zero, then community monitor system 340 may assign a community identification value of zero to a pair of edits that share an attribute. The community identification may correspond to a community. Community monitor system 340 may identify other edits that share the same attributes and assign the same community identification to the edits to indicate that the edits belong to the same community. Community monitor system 340 may assign each edit with an algorithm identification associated with the community identification. For example, if community monitor system 340 applies an algorithm to two users who belong to the same community (e.g., have the same community identification), then the algorithm will return the same value (e.g., not necessarily the same value as the community identification).

Community monitor system 340 may increase the community identification counter by one after it identifies each user that belongs to the community associated with the community identification value of zero and the corresponding algorithm identification. Community monitor system 340 may repeat the steps described above until it identifies all the communities that exist among the users. For example, community monitor system 340 may assign a new community identification equal to the value of the community identification counter to a pair of edits that share an attribute different from the attribute associated with the community identification of zero. For example, community monitor system 340 may assign a community identification value of one to a pair of edits that share an attribute different from the attribute associated with the community identification value of zero. The community identification of one may correspond to a different community from the community associated with the community identification of zero. Community monitor system 340 may identify other edits that share the same attributes and assign the same community identification to the edits to indicate that the edits belong to the same community. Community monitor system 340 may assign each edit with an algorithm identification associated with the community identification of one. In some embodiments, users 320A or 322A may be internal analysts or stakeholders who define each community and community monitor system 340 may label users with community identifications and algorithm identifications based on the definition.

In step 803, community monitor system 340 may determine a core user in each community. Community monitor system 340 may determine the core user of a community by calculating a centrality score of each user in the group. If a user has the highest centrality score, then the user will be labeled as the core user. If a user does not have the highest centrality score, then the user will not be labeled as the core user. For example, the centrality score of each user may be calculated using a degree centrality formula, where users with the highest number of links to other users in their respective communities have the highest centrality scores. For example, a user may be linked to another user if they share an attribute. A user that shares at least one attribute with many different users is linked to many users and may have a higher centrality score than a user with a single link. In some embodiments, the centrality score of each user may be calculated using a betweenness centrality formula, where users who most frequently act as bridges between other users have a higher centrality scores. These users with higher betweenness centrality scores are users who may form the shortest pathways of communication within a community. In some embodiments, the centrality score of each user may be calculated using a closeness centrality formula, where users who are closest to the other users in a community may have a higher centrality score. The closeness centrality score may be calculated by calculating the shortest path between each user and assigning each user a score based on the sum of all the paths. Users with a higher closeness centrality score may have a lower path distance to all the other users. In some embodiments, users 320A or 322A may be internal analysts or stakeholders who choose the centrality calculation formula and community monitor system 340 may determine the core users based on the chosen formula.

In step 805, community monitor system 340 may determine whether each user has been sorted into a community. If not, then community monitor system 340 may repeat steps 801-803 until it identifies all the communities that exist among the users. For example, community monitor system 340 may increase the community identification counter by one after it identifies each user that belongs to the community associated with the community identification value of n and the corresponding algorithm identification (e.g., community monitor system 340 may increase the community identification counter to n+1 after it sorts the appropriate users into the community with community identification counter n) and repeat steps 801-803, as described above until it identifies all the communities that exist among the users. If each user has been sorted into a community, then community monitor system 340 may proceed to step 807.

In step 807, community monitor system 340 may generate a community dynamics analysis based on the sorting of the plurality of users (e.g., based on the community information at that point in time). In some embodiments, community monitor system 340 may compare the community dynamics analyses at different times (e.g., compare the community dynamics analysis at the first time to the community dynamics analysis at the second time) to determine the evolution of communities (e.g., determine when malicious communities grow or beneficial communities shrink), detect when fraudulent activities occur among communities, or monitor the health of the communities or systems 100 and 300. In some embodiments, a community dynamics analysis may include any information from systems 100 or 300 (e.g., user account identifiers, attributes, time entries, pairs of edits, community identifications of users, attributes associated with each community, the number of users in each community, core users, centrality scores of users, etc.).

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for tracking online communities, comprising:
   a plurality of users;
   a memory storing instructions; and
   at least one processor configured to execute the instructions to:
     at a first time:
       label the plurality of users with a community identification of negative one;
       store the plurality of users into a data store using an algorithm;
       start a community identification counter, wherein an initial value of the community identification counter is zero;
       sort the plurality of users, by:
          determining that a group of the plurality of users belongs to a community, wherein the community has a community identification of zero;

labeling each user in the group with the community identification of zero;
labeling each user in the group with an algorithm identification, wherein the algorithm identification is associated with the community;
determining that one user of the group is a core user; and
increasing the community identification counter by one;
repeat the sorting until each user of the plurality of users is labeled with a community identification and an algorithm identification; and
generate a community dynamics analysis based on the sorting of the plurality of users.

2. The system of claim 1, wherein labeling the algorithm identification to each user comprises determining attributes of each user and associating each attribute with a different algorithm identification.

3. The system of claim 2, wherein the attributes comprise at least one of web browsing history or online purchasing history.

4. The system of claim 1, wherein determining the core user comprises calculating a centrality score of each user in the group and labeling the user with the highest centrality score as the core user.

5. The system of claim 4, wherein calculating the centrality score of each user in the group comprises determining a number of connections each user has to the other users in the group.

6. The system of claim 4, wherein calculating the centrality score of each user in the group comprises determining a distance of each connection between each user and the other users in the group.

7. The system of claim 1, wherein the instructions further comprise, at a second time:
determining that a first community with a first community identification comprises one core user; and
labeling each user in the first community with the first community identification.

8. The system of claim 1, wherein the instructions further comprise, at a second time:
determining that a first community with a first community identification comprises a plurality of core users;
determining the community identification associated with each core user of the plurality of core users;
determining the core user with the lowest numerical community identification; and
labeling each user in the first community with the lowest numerical community identification.

9. The system of claim 1, wherein the instructions further comprise, at a second time:
determining that a first community with a first community identification does not comprise a core user;
determining that the first community meets a threshold community requirement;
determining that the first community is a new community;
labeling each user in the first community with a new community identification; and
increasing the community identification counter by one.

10. The system of claim 9, wherein the threshold community requirement comprises at least one of a minimum community age or a minimum community size.

11. The system of claim 1, wherein the instructions further comprise, at a second time:
determining that a first community with a first community identification does not meet a threshold community requirement;
determining that the first community is dissolved; and
labeling each user in the first community with a community identification of negative one.

12. The system of claim 11, wherein the threshold community requirement comprises at least one of a minimum community age or a minimum community size.

13. A method for tracking online communities, comprising:
a plurality of users;
at a first time:
labeling the plurality of users with a community identification of negative one;
storing the plurality of users into a data store using an algorithm;
starting a community identification counter, wherein an initial value of the community identification counter is zero;
sorting the plurality of users, by:
determining that a group of the plurality of users belongs to a community, wherein the community has a community identification of zero;
labeling each user in the group with the community identification of zero;
labeling each user in the group with an algorithm identification, wherein the algorithm identification is associated with the community;
determining that one user of the group is a core user; and
increasing the community identification counter by one;
repeat the sorting until each user of the plurality of users is labeled with a community identification and an algorithm identification; and
generate a community dynamics analysis based on the sorting of the plurality of users.

14. The method of claim 13, wherein labeling the algorithm identification to each user comprises determining attributes of each user and associating each attribute with a different algorithm identification.

15. The method of claim 13, wherein determining the core user comprises calculating a centrality score of each user in the group and labeling the user with the highest centrality score as the core user.

16. The method of claim 13, further comprising, at a second time:
determining that a first community with a first community identification comprises one core user; and
labeling each user in the first community with the first community identification.

17. The method of claim 13, further comprising, at a second time:
determining that a first community with a first community identification comprises a plurality of core users;
determining the community identification associated with each core user of the plurality of core users;
determining the core user with the lowest numerical community identification; and
labeling each user in the first community with the lowest numerical community identification.

18. The method of claim 13, further comprising, at a second time:
determining that a first community with a first community identification does not comprise a core user;
determining that the first community meets a threshold community requirement;
determining that the first community is a new community;

labeling each user in the first community with a new community identification; and increasing the community identification counter by one.

19. The method of claim 13, further comprising, at a second time:

determining that a first community with a first community identification does not meet a threshold community requirement;

determining that the first community is dissolved; and labeling each user in the first community with a community identification of negative one.

20. A computer-implemented system for tracking online communities, comprising:

a plurality of users;

a memory storing instructions; and at least one processor configured to execute the instructions to:

at a first time:

label the plurality of users with a community identification of negative one;

store the plurality of users into a data store using an algorithm;

start a community identification counter, wherein an initial value of the community identification counter is zero;

sort the plurality of users, by:

determining that a group of the plurality of users belongs to a community, wherein the community has a community identification of zero;

labeling each user in the group with the community identification of zero;

labeling each user in the group with an algorithm identification, wherein the algorithm identification is associated with the community;

determining that that one user of the group is a core user; and increasing the community identification counter by one;

repeat the sorting until each user of the plurality of users is labeled with a community identification and an algorithm identification;

at a second time:

search the data store;

determine that a first group of users of the plurality of users are not core users;

remove the community identification associated with each user in the group; and apply the algorithm to the plurality of users in the data store to obtain a set of communities, wherein each community comprises at least one user of the plurality of users and is associated with a community identification and an algorithm identification;

if a first community with a first community identification comprises one core user, then label each user in the first community with the first community identification;

if a second community with a second community identification comprises a plurality of core users, then determine the community identification associated with each core user of the plurality of core users, determine the core user with the lowest numerical community identification, and label each user in the second community with the lowest numerical community identification;

if a third community with a third community identification does not comprise a core user and the third community meets a threshold community requirement, then determine that the third community is a new community, label each user in the third community with a new community identification, and increase the community identification counter by one;

if a fourth community with a fourth community identification does not meet a threshold community requirement, then determine that the fourth community is dissolved and label each user in the fourth community with a community identification of negative one; and generate a community dynamics analysis based on the sorting of the plurality of users.

* * * * *